UNITED STATES PATENT OFFICE.

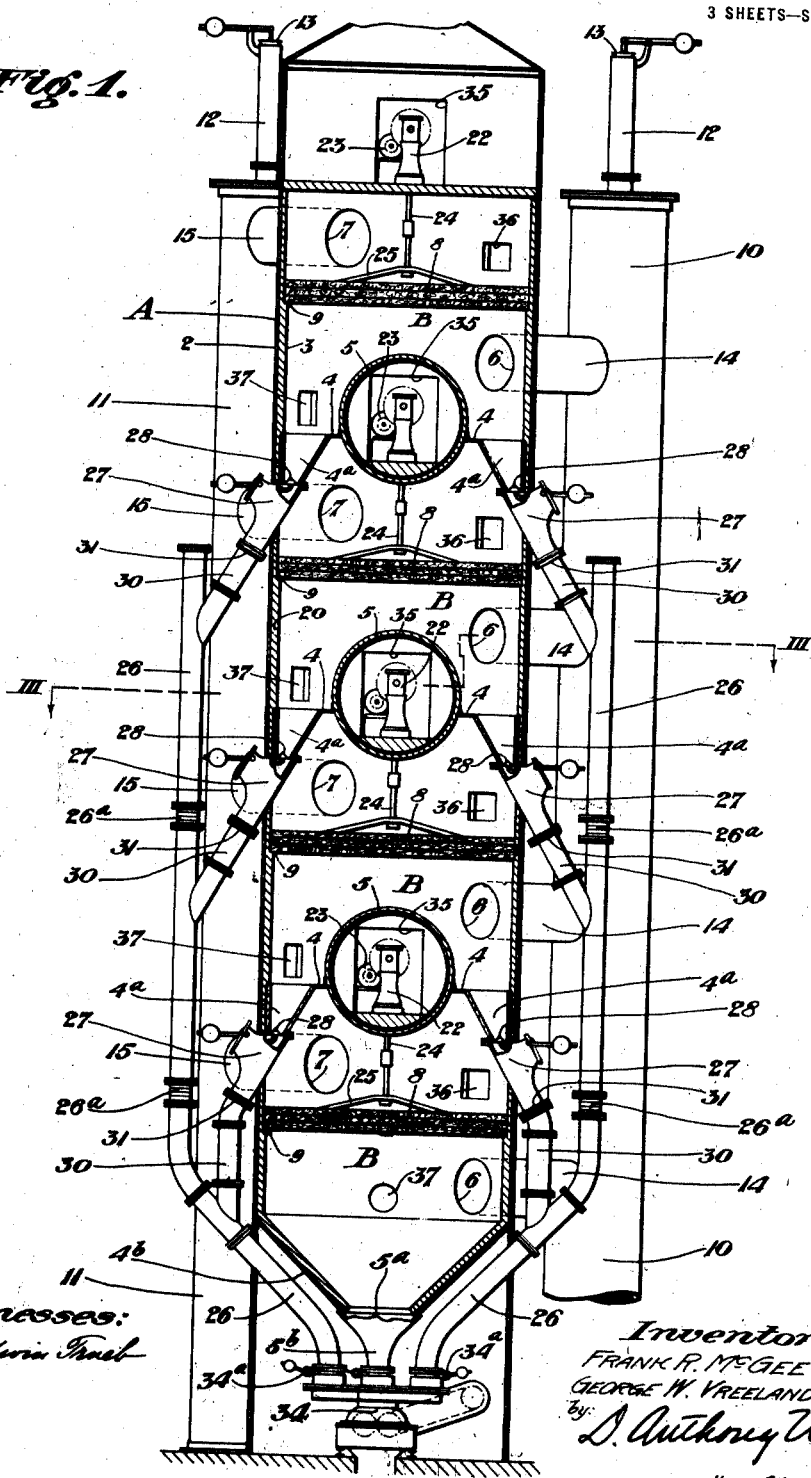

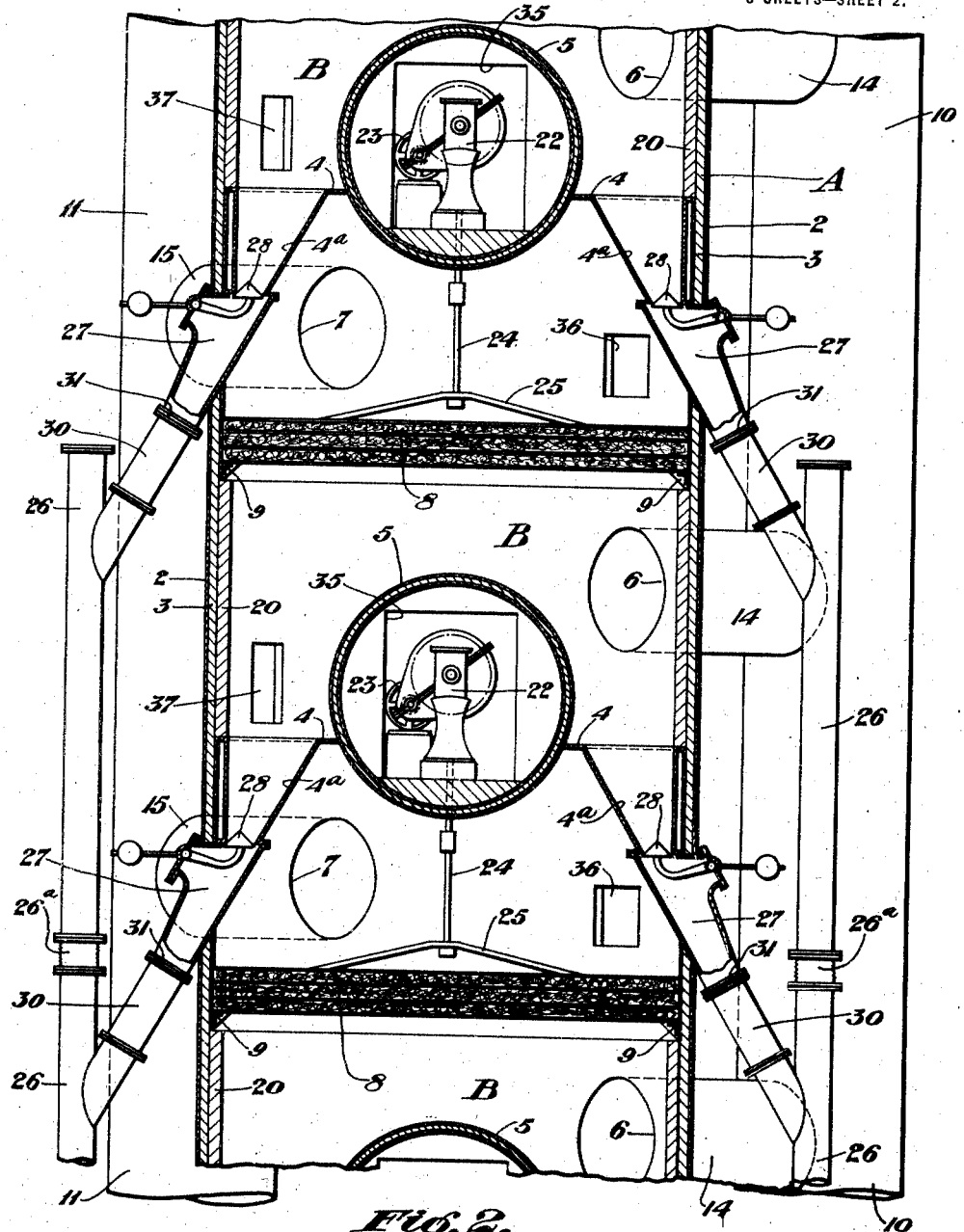

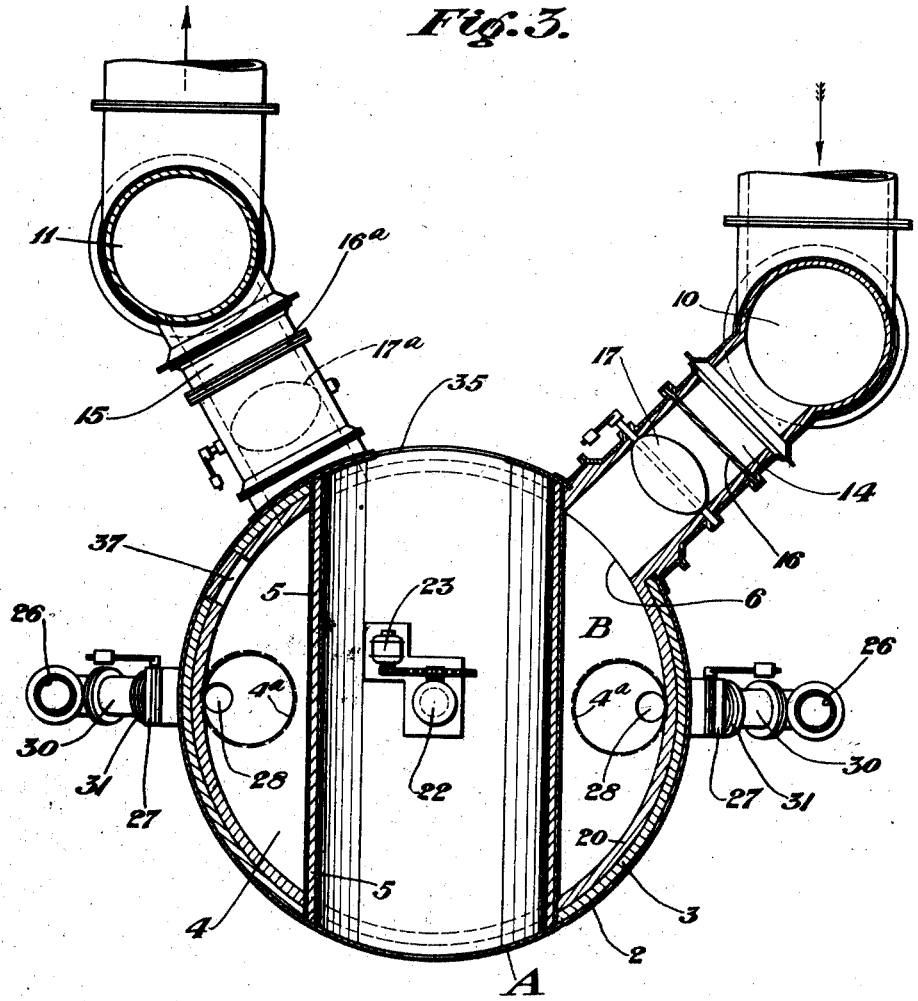

FRANK R. McGEE AND GEORGE W. VREELAND, OF STEUBENVILLE, OHIO.

DRY GAS-CLEANER.

1,396,767.  Specification of Letters Patent.  Patented Nov. 15, 1921.

Application filed June 22, 1921. Serial No. 479,514.

*To all whom it may concern:*

Be it known that we, FRANK R. McGEE and GEORGE W. VREELAND, citizens of the United States, and residents of Steubenville, in the county of Jefferson and State of Ohio, have invented certain new and useful Improvements in Dry Gas-Cleaners, of which the following is a specification.

This invention relates to gas cleaners, and more particularly to dry gas cleaners for use in removing particles of coke, ore, lime and other foreign matter from the gases produced by blast furnaces, and has for one of its objects the provision of such a device that will have a higher efficiency than such cleaners as heretofore constructed.

Another object of our invention is to so construct a cleaner of this class in the form of a tower, with several cleaning chambers built one above the other, so as to require a minimum amount of foundation and ground area, facilitate the collection of the matter taken from the gases, and to facilitate their construction.

Heretofore it has been the practice to build cleaners of this class to extend lengthwise in a horizontal plane. That is, several cleaners being necessary, they are connected together side by side, and thus necessarily cover a lot of ground.

Another disadvantage of this type of construction is that the matter removed from the gases in each cleaner is deposited in a tube or receptacle and must then be conveyed by mechanical, hydraulic, or pneumatic means to a central point for disposal.

With the present construction of tower cleaner, each cleaning unit is separate from the other, but is built in tower form, one above the other, and of cylindrical cross section, thereby providing a cheap and strong construction for holding the necessary insulating material and firebrick lining.

The foreign matter removed from the gases is gathered by gravity into vertical collecting pipes alongside the tower and falls by gravity to a pug mill or other discharging point.

Other objects and advantages may be more fully brought out in the accompanying specification and illustrated in the accompanying drawings, in which—

Figure 1 is a side elevation of a cleaner constructed in accordance with our invention, having its outer wall partly broken away to show the interior construction.

Fig. 2 is a sectional elevation on a larger scale, showing details in the construction of the apparatus of Fig. 1.

Fig. 3 is a sectional plan on the line III— III of Fig. 1.

Referring to the drawings, the letter A designates the outer cylindrical shell or wall of the cleaner as a whole, which is preferably formed of metal sheets or plates 2, having its inner surface lined or covered with any well known heat insulating material, indicated at 3.

The cleaner is subdivided into a plurality of cleaning chambers B, by transverse walls 4 and a cylindrical housing 5 arranged between and secured to the walls 4. The walls 4 are sector-shaped and fit between the housing 5 and the rounded side walls of the cleaner. The walls 4 are in the form of hoppers, that is, they are inclined downwardly, converging toward an opening or outlet $4^a$.

The bottom or lower chamber B is provided with a conical bottom $4^b$ having a central discharge opening $5^a$ therein provided with an outlet pipe $5^b$.

The cleaning chambers B are provided with a gas inlet 6 adjacent to the bottom and a gas outlet 7 adjacent the top thereof and these chambers are divided at a point intermediate said gas inlets and outlets by a filtering or cleaning mat 8, which is arranged transversely of the chamber and is supported on a flange 9 on the side walls A. The mats 8 are preferably composed of compressed steel wool, and all of the gases coming into the chambers through the inlets 6 must pass through one of the mats before it can enter the outlet 7 to leave the chamber, and, therefore, all foreign matter will be caught in the mat and the gases thoroughly cleaned.

Gas mains 10 and 11 extend vertically along the whole cleaner and each has an extension 12 of smaller diameter at its top, terminating in a valve seat and closed by a counter-weighted pressure valve 13, the valve being adapted to open when the pressure within the cleaner exceeds a predetermined maximum. The valves 13 also are arranged to be operated manually when it is desired to allow air or gas to flow freely from the mains into the atmosphere when starting the apparatus or when operating conditions demand that the pressure in the mains be relieved.

The gas main 10 which is connected at its lower end with a gas main supplying the gases to be cleaned is connected intermediate its ends by a plurality of short inlet pipes 14 with the inlets 6, which open into the cleaning chambers B below the cleaning mats 8.

The clean gas main 11 which is connected at its lower end with a clean gas main, also is connected intermediate its ends by a plurality of short outlet pipes 15 with the outlets 7, which open out of the chambers B above the cleaning mats 8.

The short pipes 14 and 15 have goggle valves 16 and 16a, respectively, mounted therein, and are further provided with butterfly valves 17 and 17a, respectively, which are mounted on shafts 18 and 18a. The valves 17 and 17a may be operated by hand or otherwise to stop the flow of gases through the respective chambers when cleaning the filter mats or when making repairs.

The walls A of the chambers B, below the mats 8, are lined with firebrick or other like material 20 to prevent undue heating of the metal plates 2 by the hot dust particles separated from the gases.

Each of the housings 5 in the cleaning chamber B is adapted to contain or house a vibrating mechanism 22 operated by a motor 23. A shaft 24 extends downwardly to the mats 8 and is adapted to reciprocate and strike against vibrating or shock receiving trusses 25 secured to the mat.

After the gases have been passing through the mats 8 for a considerable period the mats will become more or less filled with flue dust and other foreign matter removed from the gases. The vibrating mechanism 22 is then set in motion by operating the motor 23 and the mat is thereby caused to vibrate, thus shaking the mat until all of the dust which falls into the bottom of the chambers B is removed from the mat. It will of course be understood that the valves 17 and 17a in the short feed and outlet pipes 14 and 15 are closed during this vibrating operation, so that there is no circulation of gases within the chamber Dust receiving and conveying pipes 26 are arranged vertically along each side of the cleaner these pipes being provided with suitable expansion joints 26a.

A plurality of dust receiving pockets or hoppers 27 which project through the side walls of the chambers B, are secured to the walls 4, so as to register with the openings 4a. The hoppers 27 are provided with counterweighted conical valves 28 these valves being adapted to close the mouths or openings 4a in the walls 4.

The pockets 27 are connected to the dust conveying pipes 26 by pipes 30, which extend downwardly at an angle, and are provided intermediate their ends with goggle valves 31.

The lower end of the dust conveying pipes 26 and the outlet pipe 5a extending from the bottom chamber B are all connected with or open into the receiving ports of a pug mill feeder 34, and have their outlets controlled by conical counterweighted valves 34a.

The cylindrical housing 5 is provided with a door or manhole 35 to permit entrance to the housing to repair, adjust or clean the vibrating mechanism 22 or motor 23. Other manholes 36 and 37 are provided in the side walls of the chambers B above and below the mats 8, respectively, to permit entrance within the chambers when desired.

When the mats 8 are vibrated the flue dust and other foreign matter will be shaken out and fall onto the partition wall or bottom 4, and will fall by gravity against the counterweighted valves 28. When sufficient dust has collected to overcome the counterweight of the valve 28, the valve will open, discharging the accumulated dust into the pockets or hoppers 27 from which it will fall by gravity through the pipes 30 and 25 to the pug mill.

It will be understood that while we have shown and described one particular form and construction of gas cleaner, we do not wish to be limited to this particular structure, since various changes in design, construction, and combination of parts may be made within the scope of the appended claims, without departing from the spirit of our invention.

The operation of the cleaner shown and described is as follows—

The gases to be cleaned enter the dirty gas main 10 and pass through the connecting pipes 14 and inlets 6 into the lower portion of the chambers B, then flowing upwardly through the cleaning or filtering mat 8, whereby the gases are freed of all dust and foreign matter, into the upper portion of the chambers, and then passing through the outlet 7 as clean gases, through the pipes 15 into the clean gas main 11.

After the cleaner has been in operation for a certain time the mats will become more or less clogged with collected impurities. The valves 17 and 17a of one or more of the chambers B are then closed and the vibrating mechanism 22 for such chamber or chambers set in motion to clean the mat by shaking out the dust.

We claim:—

1. A dry gas cleaner arranged in tower formation comprising cylindrical side walls, top and bottom walls, a plurality of transversely arranged walls within said cylindrical side walls forming a plurality of individual cleaning chambers, said last named walls forming the top of one chamber and the bottom of the next chamber, a cylindrical housing supported by and forming a part of said walls, said housings having their ends abutting and opening through the side walls of said cleaner, a cleaning mat arranged to transversely divide each of said cleaning chambers, said mat being adapted to filter the dust from gases passing therethrough, an inlet port in each chamber below said mat, an outlet port in each chamber above said mat, and vibrating mechanism in said cylindrical housings adapted to vibrate and clean said mats.

2. A dry gas cleaner arranged in tower formation comprising side walls, top and bottom walls, a plurality of transversely arranged walls within said cylindrical side walls forming a plurality of individual cleaning chambers, said last named walls forming the top of one chamber and the bottom of the next chamber, a cylindrical housing supported by and forming a part of said walls, said housings extending above and below said transverse walls and having their ends abutting the side walls of said cleaner, a cleaning mat arranged to transversely divide each of said cleaning chambers, said mat being adapted to filter the dust from gases passing therethrough, an inlet port in each chamber below said mat, an outlet port in each chamber above said mat, and vibrating mechanism in said cylindrical housing adapted to vibrate and clean said mats.

3. A dry gas cleaner arranged in tower formation comprising cylindrical side walls, top and bottom walls, a plurality of transversely arranged walls within said cylindrical side walls forming a plurality of individual cleaning chambers, said last named walls forming the top of one chamber and the bottom of the next chamber, a cylindrical housing supported by and forming a part of said walls, said housings having their ends abutting and opening through the side walls of said cleaner, a cleaning mat arranged to transversely divide each of said cleaning chambers, said mat being adapted to filter the dust from gases passing therethrough, an inlet port in each chamber below said mat, an outlet port in each chamber above said mat, vibrating mechanism in said cylindrical housings adapted to vibrate and clean said mats, dust receiving hoppers opening into the bottom of each of said cleaning chambers, dust conveying pipes leading from said hoppers, and means for controlling the exit of dust from said hoppers into said dust conveying pipes.

4. A dry gas cleaner comprising a plurality of gas cleaning chambers arranged in tower formation one above the other, a cleaning mat arranged to transversely divide each of said chambers, said mat being adapted to filter all dirt from the gases passing therethrough, an inlet port below said mat for dirt laden gases, an outlet port above said mat to allow for the exit of the cleaned gases, gas mains communicating with each of said ports, individual means for vibrating each of said mats to release the dirt filtered from said gases, and means for allowing the exit of said dirt from said chambers at selected times after a predetermined quantity has collected therein.

5. A dry gas cleaner comprising a plurality of gas cleaning chambers arranged in tower formation one above the other, a cleaning mat arranged to transversely divide each of said chambers, said mat being adapted to filter all dirt from the gases passing therethrough, an inlet port in each chamber below said mat, an outlet port in each chamber above said mat, gas mains arranged vertically along the sides of said chambers and communicating with said ports, and means associated with said mains for relieving excess pressure therein.

6. A dry gas cleaner arranged in tower formation comprising cylindrical side walls, top and bottom walls, a plurality of transversely arranged walls within said cylindrical side walls forming a plurality of individual cleaning chambers, said last named walls forming the top of one chamber and the bottom of the next chamber, a cylindrical housing supported by and forming a part of said walls, said housings having their ends abutting and opening through the side walls of said cleaner, a cleaning mat arranged to transversely divide each of said cleaning chambers, said mat being adapted to filter the dust from gases passing therethrough, an inlet port in each chamber below said mat, an outlet port in each chamber above said mat, vibrating mechanism in said cylindrical housings adapted to vibrate and clean said mats, dust receiving hoppers opening into the bottom of each of said chambers, dust conveying pipes leading from said hoppers, and a cone-shaped counterweighted valve mounted in each of said hoppers adapted to open when a predetermined amount of dust has gathered in said hoppers to allow said dust to discharge into said dust conveying pipes.

7. A dry gas cleaner arranged in tower formation comprising cylindrical metallic side walls, metal top and bottom walls, a coating of heat insulating material on the interior surface of said walls, a plurality of transversely arranged metal walls within said cylindrical side walls forming a plurality of individual cleaning chambers, said last named walls forming the top of one chamber and the bottom of the next chamber, a cleaning mat arranged to transversely divide each of said cleaning chambers, said mat being adapted to filter the dirt from gases passing therethrough, an inlet port in each chamber below said mat, and an outlet port in each chamber above said mat.

8. A dry gas cleaner arranged in tower formation comprising cylindrical metallic side walls, metal top and bottom walls, a coating of heat insulating material on the interior surface of said walls, a plurality of transversely arranged metal walls within said cylindrical side walls forming a plurality of individual cleaning chambers, a cylindrical housing supported by and forming a part of said walls, said housings extending above and below said transverse walls and having their ends abutting and opening through the side walls of said cleaner, a cleaning mat arranged to transversely divide each of said chambers, said mat being adapted to filter the dust from said gases passing therethrough, an inlet port in each chamber below said mat, an outlet port in each chamber above said mat, gas mains arranged vertically along the sides of said chambers and communicating with said ports, means associated with said mains for automatically relieving excess pressure therein, vibrating mechanism in said cylindrical housings adapted to vibrate and clean said mats, dirt receiving hoppers opening into the bottom of each of said cleaning chambers, dust conveying pipes leading from said hoppers, and means for controlling the exit of dust from said hoppers into said dust conveying pipes.

In testimony whereof we have hereunto signed our names.

FRANK R. McGEE.
GEO. W. VREELAND.